(12) United States Patent
Zhgeng et al.

(10) Patent No.: US 10,134,023 B2
(45) Date of Patent: Nov. 20, 2018

(54) SYSTEM AND METHOD FOR DIVISION AND MANAGEMENT OF EXPENSES

(71) Applicant: JPMorgan Chase Bank, N.A., New York, NY (US)

(72) Inventors: Michelle Zhgeng, New York, NY (US); Robert Andrew Nieporent, New York, NY (US); Sean H. Murray, West Chester, PA (US); Allison Anne Keevil, West Grove, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 157 days.

(21) Appl. No.: 14/033,768

(22) Filed: Sep. 23, 2013

(65) Prior Publication Data

US 2014/0214652 A1    Jul. 31, 2014

Related U.S. Application Data

(63) Continuation-in-part of application No. 13/165,929, filed on Jun. 22, 2011, now abandoned.
(Continued)

(51) Int. Cl.
*G06Q 20/20* (2012.01)
*G06Q 20/22* (2012.01)

(52) U.S. Cl.
CPC .................. *G06Q 20/227* (2013.01)

(58) Field of Classification Search
CPC ....... G06Q 50/12; G06Q 20/20; G06Q 20/327
See application file for complete search history.

(56) References Cited

U.S. PATENT DOCUMENTS

| 5,910,988 A | 6/1999 | Ballard |
| 6,018,774 A | 1/2000 | Mayle et al. |

(Continued)

FOREIGN PATENT DOCUMENTS

| EP | 1195706 | 4/2002 |
| WO | WO2001057736 | 8/2001 |
| WO | WO2001095170 | 12/2001 |

OTHER PUBLICATIONS

International Search Report dated Aug. 27, 2014.

*Primary Examiner* — Talia F Crawley
(74) *Attorney, Agent, or Firm* — LeClairRyan PLLC

(57) ABSTRACT

Embodiments of the invention are directed to a computer-implemented expense splitting method and system for allowing a payer to divide expenses among multiple purchasers. The method may include storing, in at least one computer memory, payer data and expense splitting instructions and accessing the computer memory with at least one computer processor and executing the instructions to perform multiple steps. The steps may include converting a captured receipt image to purchase data and providing a user interface displaying entries corresponding to purchases, and further providing a tagging option for tagging each of the entries with an indicator of at least one purchaser identity. The steps may also include allocating a percentage of each entry to at least one purchaser based on the tagging, calculating an amount due from each purchaser based on the allocation, providing a payment interface for allowing online payment from the payer for a total amount of purchase; and generating reimbursement requests requesting each purchaser to reimburse the payer.

26 Claims, 12 Drawing Sheets

Related U.S. Application Data

(60) Provisional application No. 61/813,683, filed on Apr. 19, 2013.

(56) References Cited

U.S. PATENT DOCUMENTS

| | | | |
|---|---|---|---|
| 6,032,137 A | 2/2000 | Ballard | |
| 6,542,936 B1 | 4/2003 | Mayle et al. | |
| 7,881,991 B2 | 2/2011 | Darrell | |
| 8,290,237 B1 | 10/2012 | Burks et al. | |
| 8,326,642 B2 | 12/2012 | Doyle | |
| 8,380,756 B2 | 2/2013 | Mayle et al. | |
| 8,392,288 B1 | 3/2013 | Miller | |
| 8,498,900 B1 * | 7/2013 | Spirin | G06Q 50/00 340/286.09 |
| 2003/0055739 A1 | 3/2003 | Kibayashi et al. | |
| 2004/0064373 A1 | 4/2004 | Shannon | |
| 2005/0010505 A1 | 1/2005 | Darrell | |
| 2005/0043996 A1 * | 2/2005 | Silver | G06Q 10/02 705/15 |
| 2005/0240482 A1 | 10/2005 | Ikezaki et al. | |
| 2006/0143087 A1 * | 6/2006 | Tripp | G06Q 50/12 705/15 |
| 2008/0313066 A1 * | 12/2008 | Sholtis | G06Q 30/06 705/35 |
| 2009/0037286 A1 * | 2/2009 | Foster | G06Q 20/20 705/21 |
| 2010/0100434 A1 | 4/2010 | Sock | |
| 2010/0121745 A1 * | 5/2010 | Teckchandani | G06Q 10/00 705/30 |
| 2011/0093444 A1 | 4/2011 | Mayle et al. | |
| 2011/0218893 A1 | 9/2011 | Keld | |
| 2012/0010930 A1 * | 1/2012 | Langdon | G06Q 30/0207 705/14.16 |
| 2012/0084135 A1 | 4/2012 | Nissan et al. | |
| 2012/0116915 A1 * | 5/2012 | Zheng | G06Q 30/02 705/26.7 |
| 2012/0160911 A1 | 6/2012 | Herwig et al. | |
| 2012/0166332 A1 | 6/2012 | Naaman | |
| 2012/0203644 A1 | 8/2012 | Phillips | |
| 2012/0221446 A1 | 8/2012 | Grigg et al. | |
| 2012/0253852 A1 | 10/2012 | Pourfallah et al. | |
| 2012/0253915 A1 | 10/2012 | Sock | |
| 2013/0060713 A1 | 3/2013 | Xu | |
| 2014/0122274 A1 * | 5/2014 | Argue | G06Q 20/20 705/24 |

* cited by examiner

SYSTEM AND METHOD FOR DIVISION AND MANAGEMENT OF EXPENSES

RELATED APPLICATIONS

This application claims priority to Provisional Application Ser. No. 61/813,683, filed on Apr. 19, 2013, and is a Continuation-In-Part Application of U.S. patent application Ser. No. 13/165,929, filed on Jun. 22, 2011. This application is related to commonly assigned co-pending application Ser. No. 11/952,457, filed on Dec. 7, 2007 and U.S. patent application Ser. No. 13/795,147, filed on Mar. 12, 2013. Each of the above-referenced patent applications is incorporated herein by reference in its entirety.

TECHNICAL FIELD

Embodiments of the invention are related to systems and methods for facilitating management of expenses through capture and utilization of information traditionally provided on paper point-of-sale (POS) receipts.

BACKGROUND OF THE INVENTION

Consumers have increasingly become "cashless" and are becoming more inclined to use credit cards and other non-cash vehicles to pay for goods and services. Furthermore, consumers have grown accustomed to mobile technologies and are often able to pay for goods and services through various applications on their smart phones, tablets, or other devices.

While it may often be more convenient to make electronic payments than cash payments, it is often more difficult to split expenses between group members with electronic payments. For example, when a group visits a restaurant, each member may want to pay for only his or her portion of the bill. While some restaurants may split the check between multiple credit cards, others may be reluctant to do so especially in view of the increasing fees to the merchant for accepting multiple cards for one bill. Furthermore, while restaurants may be willing to split a bill evenly, they typically will not allocate expenses so that each person pays for his or her own purchases and will not offer separate checks for very large groups of customers. Thus, it is difficult for individuals to adhere to a budget when participating in a large group purchase.

Another problem arises due to lack of electronically provided information for record keeping, especially when consumers intend to split expenses, since detailed information is required to accurately divide the expenses. While business may issue paper receipts, when consumers make purchases with a credit card, the electronic records of the purchase include a POS transaction record and a credit card record derived from the POS transaction record. Frequently, because the receipt is a paper receipt, it remains disjointed from and is never linked with any electronic purchase information. When purchases are made online, the receipt from the merchant may be delivered electronically. However, when purchases are made in person, receipts are typically traditional paper receipts. In either case, the receipt may include information that is not readily available through POS records or through credit card records. For example, the receipt may include specific information related to goods or services purchased, whereas other records may merely include general information such as a total amount charged, merchant identifying information.

Furthermore, customers are then required to retain the receipt so that they can produce it upon returning a purchased item or upon exercising a warranty, or simply in order to keep an accurate record of expenses. Paper receipts can easily be lost or accidentally thrown away. Furthermore, with the availability of electronic record keeping, the distribution of paper receipts creates unnecessary waste.

To overcome the difficulties explained above with respect to lost information on paper receipts and the lack of consolidation with electronic receipts, systems have been proposed for capturing receipt images, transforming the image information to data, and storing and otherwise operating on the transformed data. For example, co-pending application Ser. No. 13/165,929, filed on Jun. 22, 2011, and Ser. No. 13/795,147, filed on Mar. 12, 2013, both of which are incorporated herein by reference, disclose methods for capturing the receipt data and integrating it with existing expense management systems.

Accordingly, due to the above-mentioned deficiencies with currently existing systems, a solution is needed for incorporating recently developed data capture technologies to reduce burdens associated with paper receipts and improving expense management capabilities based on the information contained in the paper receipts. A solution is needed for minimizing dependence on paper receipts and facilitating expense management by purchasers. Furthermore, a solution is needed that is capable of implementing a captured receipt image for expediting and facilitating splitting of expenses between customers.

SUMMARY OF THE INVENTION

A computer-implemented expense splitting method for allowing a payer to divide expenses among multiple purchasers is provided. In an embodiment of the invention, the method includes storing, in at least one computer memory, payer data and expense splitting instructions. The method additionally includes accessing the computer memory with at least one computer processor and executing the instructions to perform multiple steps. The steps include converting a captured receipt image to purchase data and providing a user interface displaying entries corresponding to purchases. The method additionally includes providing a tagging option for tagging each of the entries with an indicator of at least one purchaser identity. The method includes allocating a percentage of each entry to at least one purchaser based on the tagging and calculating an amount due from each purchaser based on the allocation. The method additionally includes providing a payment interface for allowing online payment from the payer for a total amount of purchase and generating reimbursement requests requesting each purchaser to reimburse the payer for the amount due from the purchaser, the reimbursement request providing access to an interface allowing online reimbursement to the payer.

In an additional aspect of the invention, a computer-implemented expense splitting system is provided for allowing a payer to divide expenses among multiple purchasers. In embodiments of the invention, the system includes at least one computer memory storing payer data and expense splitting instructions and at least one computer processor accessing the computer memory and executing the instructions to perform multiple steps. The steps include converting a captured receipt image to purchase data, providing a user interface displaying entries corresponding to purchases, and further providing a tagging option for tagging each of the entries with an indicator of at least one purchaser identity. The steps additionally include allocating a percentage of each entry to at least one purchaser based on the tagging and calculating an amount due from each purchaser based on the allocation. The system may further provide a payment interface for allowing online payment from the payer for a total amount of purchase and may generate reimbursement requests requesting each purchaser to reimburse the payer for the amount due from the purchaser, the reimbursement request providing access to an interface allowing online reimbursement to the payer.

In an additional aspect of the invention, a computer-implemented expense splitting method may be provided for allowing a payer to divide expenses among multiple purchasers. In embodiments of the invention, the method includes storing, in at least one computer memory, payer data and expense splitting instructions and accessing the computer memory with at least one computer processor and executing the instructions to perform multiple steps. The steps may include converting a captured receipt image on a mobile device to purchase data and creating a record of the expenses in an expense management system, wherein creating a record includes, matching the purchase data for each captured receipt image with a corresponding POS transaction record, categorizing the purchase data into one of multiple categories, and storing the purchase data in a receipt vault. The method additionally includes providing a user interface on the mobile device displaying entries corresponding to purchases, and further providing a tagging option for tagging each of the entries with an indicator of at least one purchaser identity. The steps may also include allocating a percentage of each entry to at least one purchaser based on the tagging, calculating an amount due from each purchaser based on the allocation, and providing a payment interface on the mobile device for allowing online payment from the payer for a total amount of purchase. After payment is made, the system may generate reimbursement requests requesting each purchaser to reimburse the payer for the amount due from the purchaser, the reimbursement request providing access to an interface allowing online reimbursement to the payer, the generated reimbursement requests sent by email to each purchaser.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the invention provide a system for allocating each item on a receipt for a purchase so that only the appropriate parties bear the expense. Furthermore, embodiments of the invention enable the parties splitting the purchase to quickly and efficiently electronically settle their finances between one another. Embodiments of the present invention are further directed to a method and system for reducing burdens associated with paper receipts and improving expense management capabilities based on the information contained in the paper receipts. The system minimizes dependency on paper receipts and facilitates expense management by users.

Furthermore, embodiments of the invention are able to provide a combined product suite as a result of the resources and offerings supplied by the financial institution managing the system. Expense splitting functionality can be offered in combination with automated payment functionality, such as Chase QuickPay™, and other components of the mobile application. The automated payment functionality can be used both to pay for a purchase and to reimburse payers for payment of purchases. The system may be implemented for dividing restaurant expenses, but also may be used to split grocery bills, recurring bills, or entertainment purchases. As examples, college students, young professionals splitting expenses, or employees being reimbursed by their employers may benefit from the functionality provided by the system.

Figure 1:
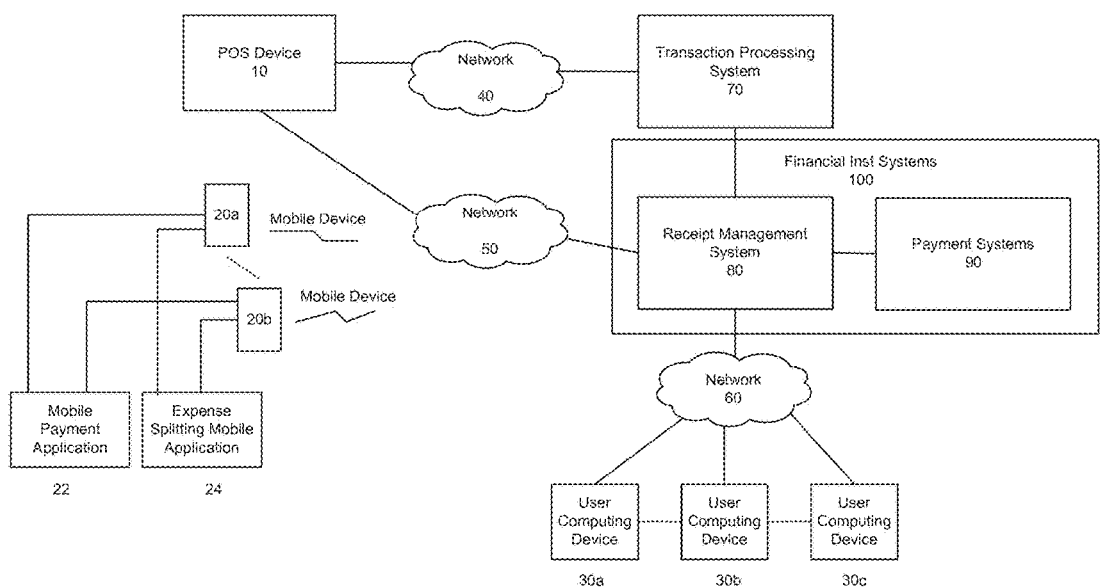
FIG. 1 is a block diagram illustrating an operating environment for expense splitting and receipt management systems in accordance with an embodiment of the invention.

FIG. 1 is a block diagram illustrating an operating environment for expense splitting and receipt management systems in accordance with an embodiment of the invention. A point of sale (POS) device 10 may be connected over a network 40 with a transaction processing system 70 and over a network 50 with financial institution systems 100. The financial institution systems 100 may include a receipt management system 80, payment systems 90, and other systems known to be operated by financial institutions. Mobile devices 20a . . . 20b may also connect over the network 50 with the financial institution systems 100 and the POS device 10. System users may connect using computing devices 30a . . . 30c over a network 60 with the financial institution systems 100. Although multiple networks are shown, a smaller or larger number of networks may be provided. All of the system components may communicate over a single network, such as the Internet, with the financial institution systems 100.

The POS device 10 may be disposed at the location where a transaction occurs. A POS terminal may refer to the hardware and software used for checkouts. A retail POS system typically includes a computer, monitor, cash drawer, receipt printer, customer display and a barcode scanner, and a debit/credit card reader. It can also include a weight scale, integrated credit card processing system, a signature capture device and a customer pin pad device. Many POS monitors use touch-screen technology for ease of use and a computer is built in to the monitor chassis for what is referred to as an all-in-one unit. The POS system software can typically handle a myriad of customer based functions such as sales, returns, exchanges, layaways, gift cards, gift registries, customer loyalty programs, and quantity discounts.

The mobile devices 20a, 20b may also be referenced as handheld devices, handheld computers or simply handhelds. These may be pocket-sized computing devices, typically having a display screen with touch input and/or a miniature keyboard. In the case of the personal digital assistant (PDA), the input and output are often combined into a touch-screen interface. The mobile devices 20a, 20b may also be or include iPhones™, iPads™, net books, Android™ phones, E-readers, or other smart phones or other devices. Typically these devices are equipped with cameras or other imaging devices. In embodiments of the invention, these imaging devices may be implemented to capture receipt images, which will be more fully explained below. However, in additional embodiments, the image capture can occur on an alternative device, such as an ATM or any device including a scanner or imaging device.

The mobile devices 20a . . . 20b may store applications including a mobile payment application 22 and an expense splitting application 24. The mobile payment application 22 may be an application offered by the financial institution 100 or other financial institution. The mobile payment application 22 may have functionality such as that offered by Chase QuickPay™. Mobile payment application 22 may allow customers to send payments to businesses or individuals. The expense splitting application 24 may provide functionality for allowing users to split expenses in accordance with embodiments of the invention, as will further be described below with reference to FIG. 2.

The user computing devices, 30a-30c may be or include any type of computing device. These computing devices 30a . . . 30c may allow users to access the financial institution system 100, These computing devices enable user access to the receipt management system 80 to facilitate generation and viewing of reports and also the payments systems 90 for receipt and generation of payments and status checks pertaining to payments.

The networks 40, 50, and 60 may be the same or different networks and may include a wired or wireless local area network (LAN) and a wide area network (WAN), wireless personal area network (PAN) and other types of networks. When used in a LAN networking environment, computers may be connected to the LAN through a network interface or adapter. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

The transaction processing system 70 automates the handling of data related to debit and credit transactions. Data available from the POS about each transaction are captured, transactions are verified and accepted or rejected and validated transactions are stored for later aggregation. Reports may be produced immediately to provide standard summarizations of transactions and transactions may be moved from process to process in order to handle all aspects of the business activity. The POS information may be transmitted to the receipt management system 80 for storage and matching with image data from a captured receipt and with credit card or other records. Illustrative examples of transaction processing systems are described for example, in U.S. Pat. No. 4,877,947 to Mori, U.S. Pat. No. 5,604,802 to Holloway, U.S. Pat. No. 4,375,032 to Uchida, U.S. Pat. No. 4,423,313 to Tanigaki, U.S. Pat. No. 4,594,663 to Nagata, U.S. Pat. No. 4,423,318 to Gotou, U.S. Pat. No. 4,587,379 to Masuda; U.S. Pat. No. 5,809,483, and U.S. Pat. No. 6,039,245 to Symonds.

The receipt management system 80 interacts with the mobile devices 20 to collect receipt images and manipulates and shares the data collected over the network 60 with user computing devices 30 and with the mobile devices 20. Embodiments of the receipt management system 80 are further described below with reference to FIG. 9.

Figure 2:
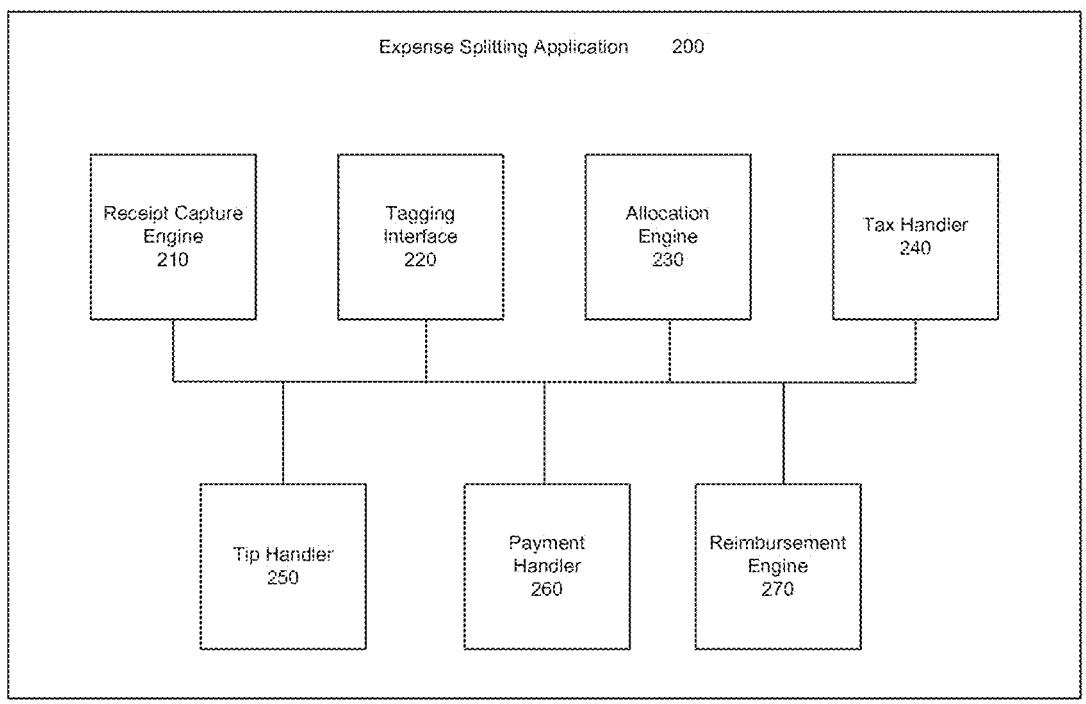
FIG. 2 is a block diagram illustrating an expense splitting application in accordance with an embodiment of the invention.

FIG. 2 is a block diagram illustrating an expense splitting application 200 in accordance with an embodiment of the invention. The expense splitting application 200 may include multiple software modules executed by a computer processor to perform various functions related to splitting of expenses. The expense splitting application 200 may include, for example, a receipt capture engine 210, a tagging interface 220, an allocation engine 230, a tax handler 240, a tip handler 250, a payment handler 260, and a reimbursement engine 270.

The receipt capture engine 210 operates in conjunction with the mobile device processor to capture a receipt image for a transaction and transform the receipt image to receipt image data. For example, the receipt capture engine 210 may perform optical character recognition (OCR) in order to transform the image to data. Optionally, the receipt capture engine may send the captured image over a network to another location, such as the financial institution system 100 so that the OCR and transformation to data will be performed elsewhere. However, these steps may occur at the mobile device. Once the transformation is performed, the receipt capture engine 210 may distribute the data for use in other systems, such as an expense management system, in which the receipt image data is matched with a POS transaction record. The receipt capture engine 210 also may store the data as well as the image and may utilize the data in various user interfaces instrumental for expense splitting functionality.

The tagging interface 220 provides a tagging interface for a particular purchase, such as a restaurant check. Thus, the interface will typically provide a list of multiple items included within a purchase. Each item will be taggable or selectable to include one or more purchaser identities. The purchaser identities may be maintained in the mobile application or may be extracted from other associated systems. Each user has his or her own purchaser identity, which can be used for tagging of purchases. Thus, the tagging interface 220 is interactive and allows the user of the mobile device to tag each item within a purchase with one or more purchaser names.

The allocation engine 230 may operate on the information entered through the tagging interface 220 once each item has been tagged with at least one purchaser. If an item on the tagging interface is tagged with identities of three purchasers, the allocation engine will split the cost of the item three ways and allocate one third of the expense to each purchaser. The allocation engine 230 operates on each item purchased to perform the allocation accordingly.

The tax handler 240 may be provided to split taxes proportionately to the allocated expenses. For example, if a first purchaser is allocated two thirds of the expenses, the tax handler 240 may determine that two thirds of the tax expense should be paid by the first purchaser, provided that all of the items within the purchase are taxable items. If some of the purchases are not taxable or are not equally taxable, the tax handler 240 may be configured to make this determination and operate accordingly.

The tip handler 250 may be provided for handling of tips for purchases at restaurants, hotels, or other venues where tipping is customary. In embodiments of the invention, each of the multiple purchasers may enter a tip. The tip may be entered for example, on the tagging interface. In alternative embodiments of the invention, the payer may select a tip amount and may allow the tip to be allocated based on percentage of purchase. Additionally, in situations in which the tip is already included in the bill, such as when a large party dines at a restaurant, the allocation engine 230 may allocate the tip either based on the percentage of the bill allocated to each purchaser or evenly among the purchasers. In additional embodiments, the payer may elect a tip-handling method from a tip handling interface. The method may be a customized method or a provided default method.

The payment handler 260 may incorporate or interface with payment system 90 operated by the financial institution system 100 in order to allow payment for the purchase with the mobile device 20. The payment handler 260 may allow authorization for and recording of payment for the purchase.

The reimbursement engine 270 may operate upon payment through the payment handler 260 to request reimbursement of the payer from each purchaser. The reimbursement requests may interact with payment systems accessible to each purchaser's mobile device. The reimbursement engine 270 may provide reimbursement requests with a selectable option to "Pay Now". Thus, upon receipt of the reimbursement request, purchasers may be immediately directed to a payment interface so that they can quickly and expeditiously reimburse the payer. In embodiments of the invention, the reimbursement engine 270 may track reimbursements and may send reminders if the reimbursements are not received within a particular timeframe. The time trigger for sending a reimbursement reminder may be set to a default value, or alternatively may be set by the payer requesting reimbursement. The payer may reset the time for each purchase or may store a reimbursement time period for universal use. In embodiments of the invention, the reimbursement engine 270 may interact with a collections system that will take over reimbursement processing if a purchaser fails to reimburse the payer. Ideally, however, both payment and reimbursement can be accomplished in real time upon completion of the purchase. For example, when paying a restaurant check, the payer may pay with a mobile device. Other purchasers may immediately use their own mobile devices to reimburse the payer.

Figure 3:
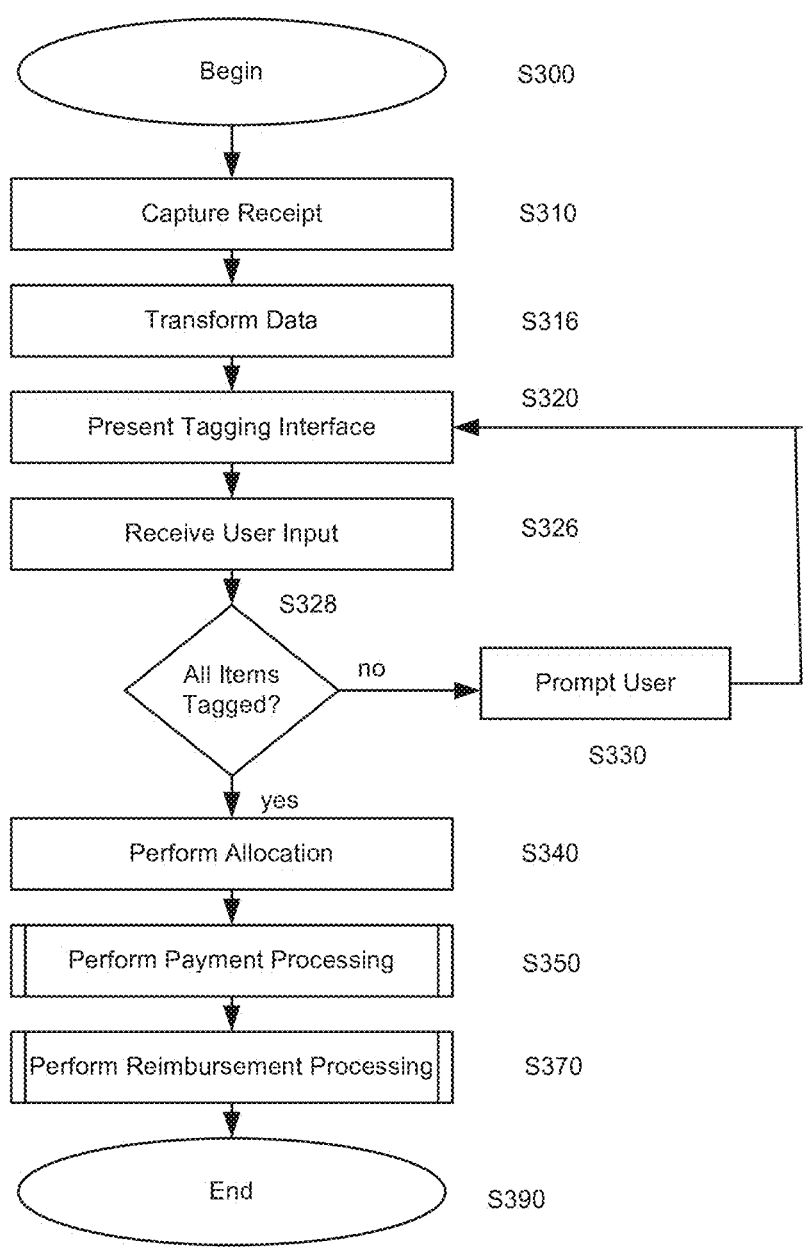
FIG. 3 is a flow chart illustrating an expense splitting method in accordance with an embodiment of the invention.

FIG. 3 is a flow chart illustrating an expense splitting method in accordance with an embodiment of the invention. The method begins in S300 and the expense splitting application is implemented by at least one processor to capture a receipt for a purchase at S310 and transform the receipt image to receipt image data in S316. As set forth above, transformation of the receipt image to data can alternatively be performed at the receipt management system. The two systems might then share the information over a provided network. In S320, the system presents a tagging interface allowing the payer and the other purchasers to tag purchased items. In some embodiments, other items, such as taxes and tip, may also be tagged. Once the purchasers have completing the tagging in S320, the system receives the user input from the tagging interface in S326 and determines in S328 whether all displayed items have been tagged. If the displayed items have not been tagged in S328, the system may prompt the user for additional tagging in S330 and present the tagging interface again. The tagging interface may be shown with visual indicators, such as arrows or highlights or other indicators adjacent or pointing to items that have not been tagged. If all items have been tagged in S328, the system may proceed to perform allocation in S340. The allocation step S340 may be a process with multiple steps performed through interaction between the allocation engine, the tax handler, the tip handler, and other components. After allocation has been performed in S340, payment processing may be performed in S350 upon receipt of a payer request for payment.

After the payment request has been accepted in S350, the reimbursement engine generates, monitors, and processes reimbursement requests in S370. In embodiments of the invention, the reimbursement requests can be forwarded. Although the payer may forward the reimbursement request automatically to one of the purchasers, the purchaser system may be configured to automatically forward the reimbursement request to another system. For example, for students, they may have agreements with their parents to pay for certain types of expenses. Filtering functionality could automatically forward the reimbursement requests. Additionally, in embodiments of the invention, if the participants are meeting for work-related activities, their expenses may be reimbursed by their employers. The application may automatically forward the reimbursement requests based on stored settings. The process ends in S390.

Figure 4:
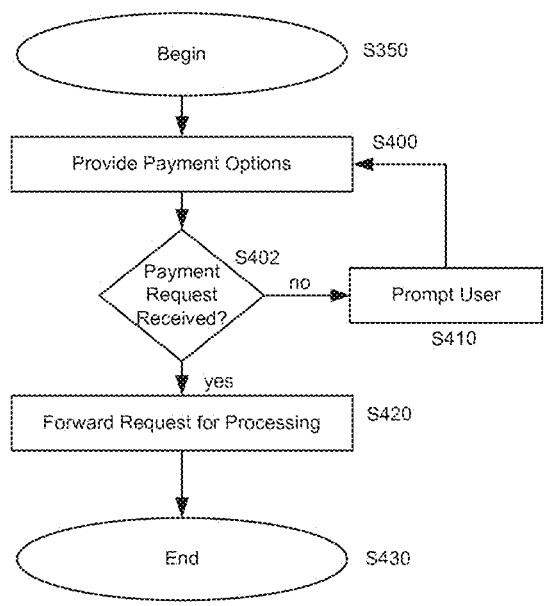
FIG. 4 is a flow chart illustrating a payment processing method performed within an expense splitting method in accordance with an embodiment of the invention.

FIG. 4 is a flow chart illustrating a payment processing method S350 performed within an expense splitting method in accordance with an embodiment of the invention. In S400, the system provides payment options to users. Those payment options may include credit card, debit card, check, electronic check, cash or any other form of payment. If the system receives a payment request for payment through one of these methods in S402, the system forwards the payment request for processing in accordance with the selected method in S420. If no payment request is received in S402, the system may continue to prompt the user in S410 and provide payment options in S400 until the payment request is received. The process ends in S430.

Figure 5:
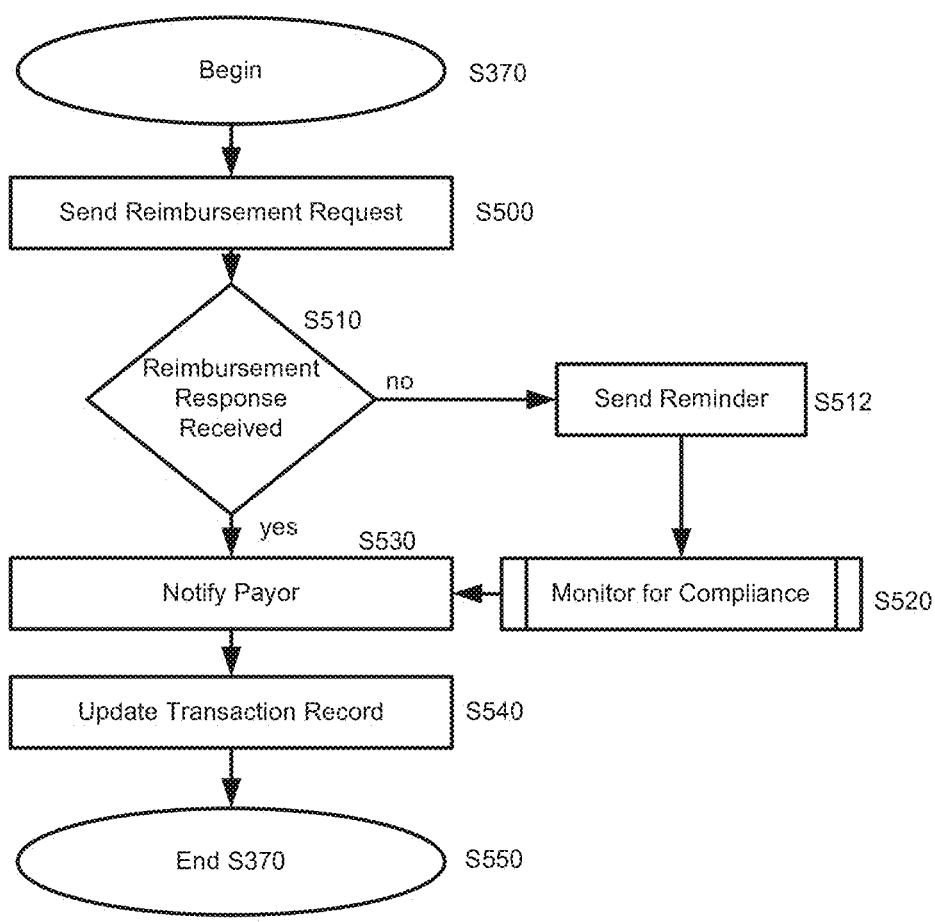
FIG. 5 is a work flow diagram illustrating a reimbursement processing method that may be implemented in accordance with an embodiment of the invention.

FIG. 5 is a work flow diagram illustrating a reimbursement processing method S370 that may be implemented in accordance with an embodiment of the invention. In S500, the system may generate and send reimbursement requests in accordance with the allocation. These requests may be generated to each purchaser tagging an item. Generation of the reimbursement requests may be triggered by receipt of payment from the payer. In S510, the system determines if a reimbursement response has been received from each purchaser. If no response has been received in S510, the system may send a reminder to the purchaser in S512 and monitor for compliance in S520. Compliance may be monitored by setting time limits for payment and generating reminders when the purchasers have not complied with the time limits. Furthermore, in embodiments of the invention, the system may forward overdue accounts to a collections system for collection and enforcement. If the reimbursement response is received in S510, the system notifies the payer in S530 and updates the transaction record to show that reimbursement has been completed in S540. In embodiments of the invention, reimbursement for each purchaser involved in a purchase is collectively monitored, such that the system notifies the payer both when each reimbursement is received and when all reimbursements have been received. The process ends in S550.

Figure 6:
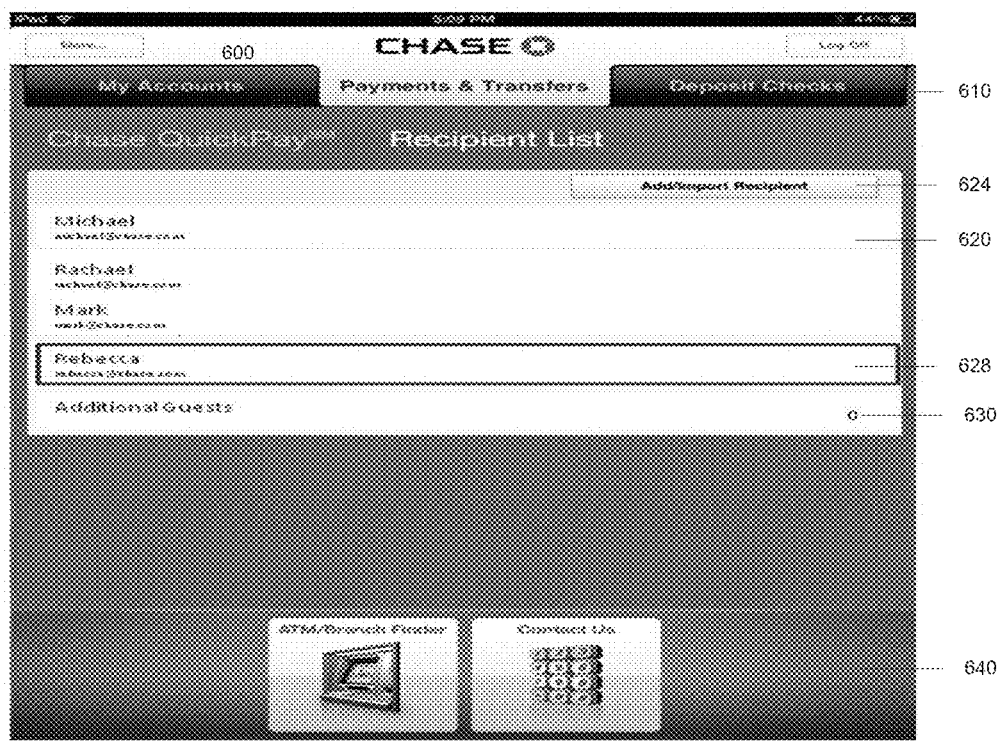
FIG. 6 is a user interface illustrating a payment recipient list that may be implemented in accordance with an embodiment of the invention.

FIG. 6 is a user interface 600 illustrating a payment recipient list that may be implemented in accordance with an embodiment of the invention. The user interface 600 may provide multiple tabs 610 for allowing viewing of accounts, payments and transfers, depositing of checks, and other options. The payment interface may include a recipient list 620 including one or more recipients that allows modification of recipients at 624 and selection of recipients as shown at 628. A number of additional guests present for splitting expenses may be illustrated at 630. The additional guests may be added or imported using functionality 624. Other options 640 may also be provided on the interface.

Figure 7:
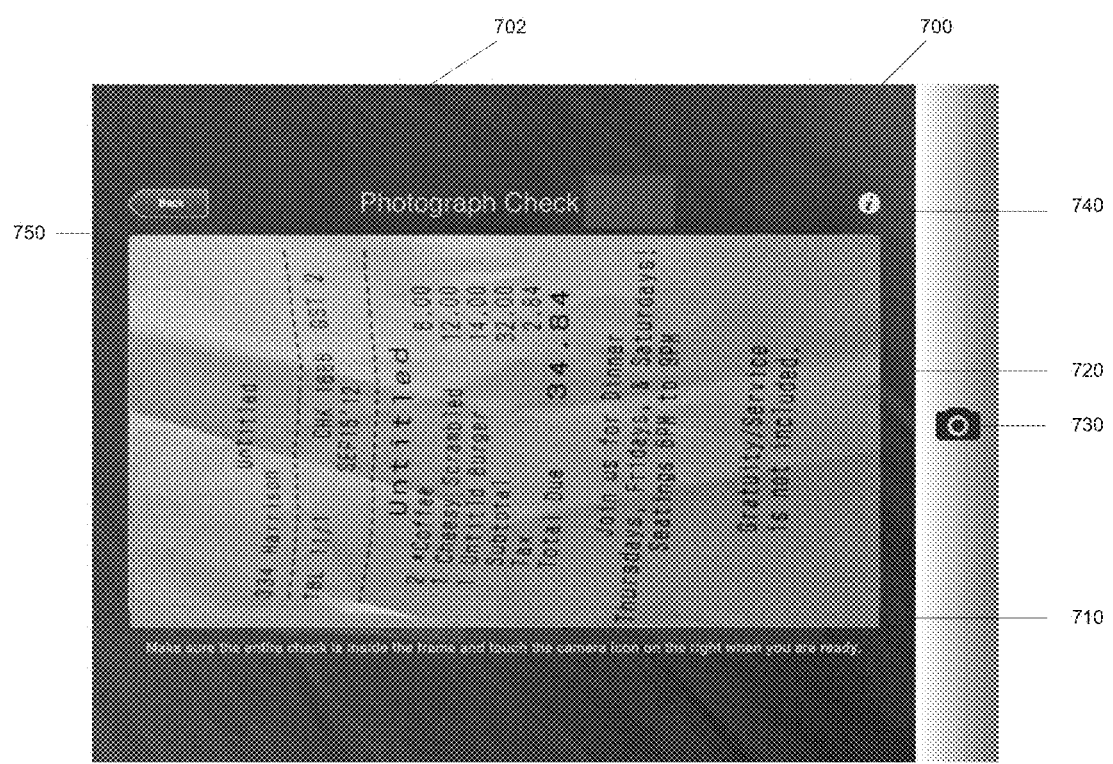
FIG. 7 is a user interface illustrating a method for receipt capture in accordance with an embodiment of the invention.

FIG. 7 is a user interface 700 illustrating a method for receipt capture in accordance with an embodiment of the invention. Instructions 710 may be provided to explain receipt capture to the user. For example, the user may employ a mobile device camera to capture a receipt which is displayed within boundaries 702. Options 750 may be provided to photograph the receipt and to scroll back to a previous frame. Additional information may be provided at 740. An image of the receipt 720 may be shown and camera icon 730 may be used to capture the image.

If the receipt is of a length too great to be captured in a single frame by the mobile device camera, a "long receipt" capture method may be used to capture an image of the receipt. Such a "long receipt" capture method is disclosed in co-pending U.S. patent application Ser. No. 13/795,147, which is incorporated herein by reference.

Figure 8:
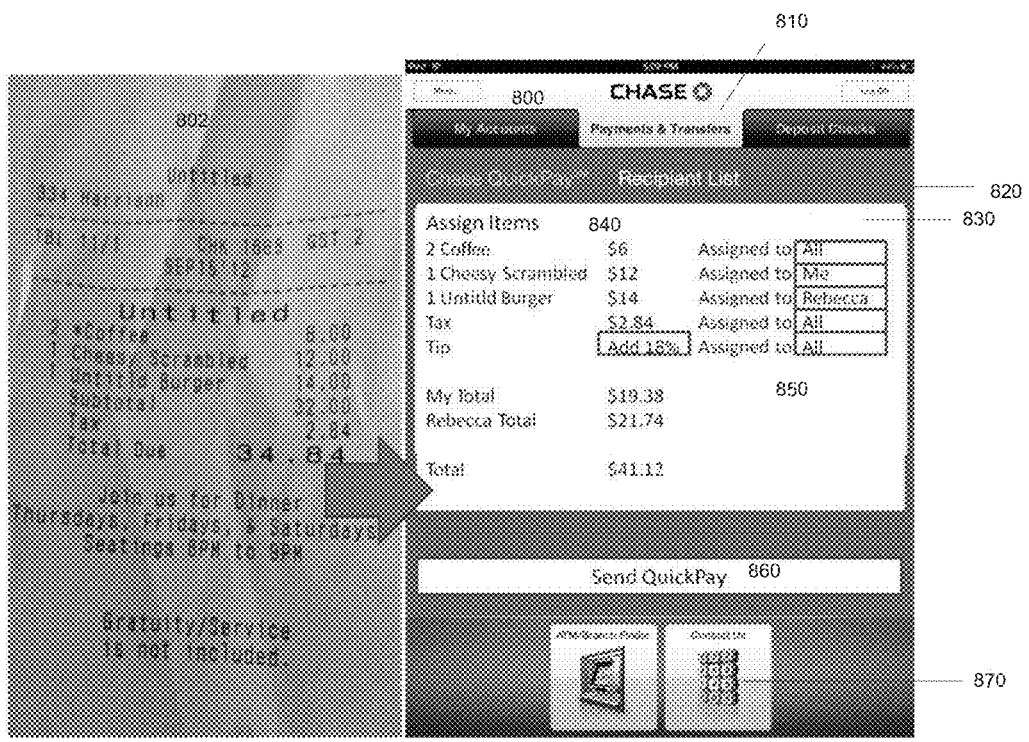
FIG. 8 is a user interface illustrating an expense splitting method in accordance with an embodiment of the invention.

FIG. 8 is a user interface 800 illustrating tagging within an expense splitting method in accordance with an embodiment of the invention. A payments and transfers tab 810 may be selected from the interface 800. A captured receipt 802 may have its data imported into the interface 800. Purchased items 840 may appear in taggable format on the interface 800. Assignments for each purchased item are shown at 830. Totals for each purchaser are shown at 850. The interface provides the payer with an opportunity to send a payment via QuickPay™ at 860. Other payment methods may also be implemented. Additional resources 870 may be reached from the payment interface 800. The basic flow would be users take a picture of the receipt which is translated to text, then users tag users to each item (either all to split evenly or specific users) and the totals are calculated and the option to send a QuickPay™ request will show up so that the user can pay the entire bill and have the friends pay back via QuickPay™.

As an exemplary scenario of use for the expense splitting method, when Jane and her roommate Sophie go out to dinner, Sophie typically purchases two glasses of wine and steak and lobster. Jane, on the other hand, drinks water and eats only a salad. Jane and Sophie then share a dessert. Thus, when the check arrives, Jane does not want to share in the expense equally and Sophie is willing to pay a greater share of the bill corresponding to her purchases. Accordingly, Jane accesses the check splitting application on her smart phone. The application prompts Jane to capture a photograph of the receipt. The system operates on the captured photograph to have the purchased items on the receipt image transformed to text to render them interpretable as data. Once the items are translated to text, the system produces the tagging interface and Jane and Sophie can tag each item accordingly. Thus, Sophie tags the two glasses of wine, the steak and the lobster. Jane tags the salad. Both Sophie and Jane tag the dessert. The application then automatically splits the tax based on their respective bills. Both Sophie and Jane have the opportunity to enter a tip. The application then provides an option for Jane to send a QuickPay™ request to Sophie for her allocated expenses. Jane can also pay the entire bill through her application and allow the application to generate a reimbursement request for Sophie to reimburse Jane via QuickPay™.

The restaurant bill is merely an example. People often share expenses in other situations, such as gas and food for road trips and household goods for roommates. The mobile application can also be advantageous in these situations to avoid the necessity for passing cash back and forth.

While the application may operate on a paper receipt, it can also be used for electronic receipts. In this instance, the receipt could be transmitted to the user's mobile device and there would be no need for image capture. If the electronic receipt is in image format, it also may be transformed to data.

Additionally, while the application is useful at the point of purchase, it may also be possible to pay the entire bill, send the receipt to storage, and request reimbursement at a later time. Any stored receipts can also be split later or stored for historical purposes. This feature is also useful when only one member of the group has a cell phone. Reminders can be triggered to the other members to make reimbursements at a later time.

Figure 9:
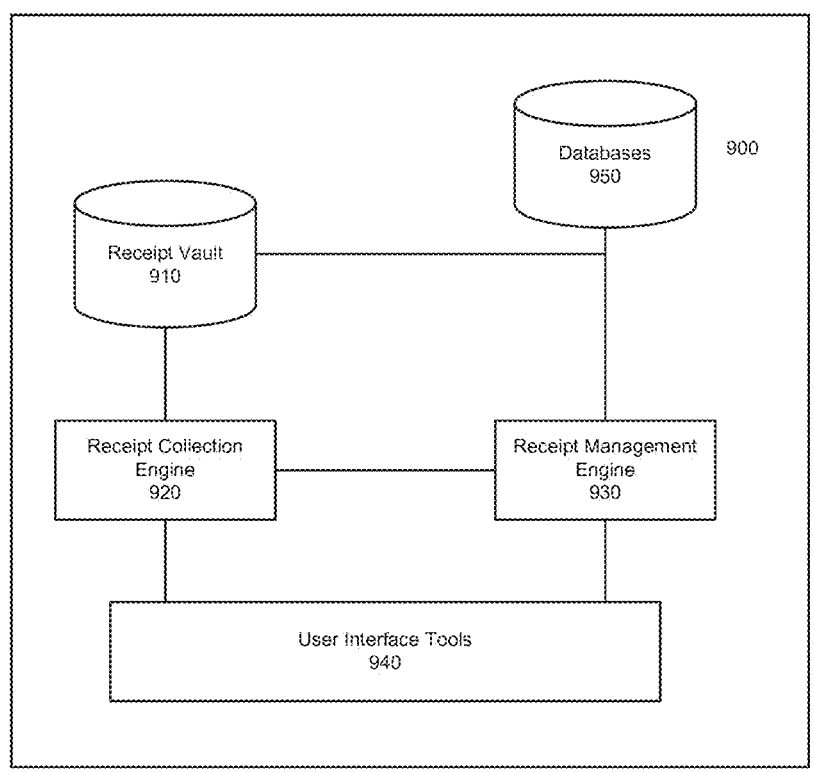
FIG. 9 is a block diagram illustrating a receipt collection and management system in accordance with an embodiment of the invention.

FIG. 9 is a block diagram illustrating a receipt processing and expense management system 900 that may be implemented in accordance with an embodiment of the invention to interact with and store information from the mobile payment application and expense splitting application. User interface tools 940 may communicate over the aforementioned networks with users and external systems. A receipt collection engine 920 manages receipt intake and provides receipts to a receipt management system 930 for processing and a receipt vault 910 for storage. The receipt management system 930 may also access additional internal or external databases 950 as will be further explained below. The receipt management system 900 may operate interactively to receive information from and transmit information to the expense splitting application 200.

The receipt vault 910 stores receipts collected by the receipt collection engine 200. The receipt collection engine 920 may receive the images from the mobile or other devices and prepares them for storage in the receipt vault 910. For example, the receipt collection engine 910 may receive the captured receipts from the expense splitting application. While in some embodiments of the invention, the expense splitting application 200 may convert the captured receipt image to receipt data, other embodiments may permit the captured receipt image to be transmitted to the expense management system for transformation of the receipt image to receipt data. The receipt vault 910 may store both receipt images and receipt image data.

Thus, the receipt collection engine 920 may operate to import receipts, match receipts with POS and other data, perform OCR to transform the receipt image to receipt data, store the receipt image in the receipt vault, and allow user management of the captured and stored data.

Importation of the captured receipt image may depend upon the characteristics of the captured receipt image or the electronic receipt provided by a merchant. The receipt collection engine may receive user requests to match the receipt image with additional data such as the POS transaction record. Alternatively, the receipt management system 930 may be automated to perform this function upon the performance of OCR on the receipt. OCR components may be provided to operate on the receipt image in order to translate the scanned images of handwritten, typewritten or printed text into machine-encoded text. OCR makes it possible to edit the text, search for a word or phrase, store it more compactly, display or print a copy free of scanning artifacts, and apply techniques such as machine translation, text-to-speech and text mining to it. The system may be capable of reproducing formatted output that closely approximates the original scanned page including images, columns and other non-textual components.

Once the information from the receipt is collected and converted to data, the system enables the purchaser to categorize purchases, manage projects by tagging purchases across categories, and to create customized reports. Alternatively, the system may be configured to automatically perform some or all of these functions based on the information gathered from the receipt.

The receipt collection engine 910 captures information that may only be available on the receipt and is likely not available in the POS record. For example, the receipt may include various characteristics of the purchase including the exact items purchased, the size of each item, the quantity of each item, the price of each item, discounts from the usual price for each item, SKU, department, sales tax, and total amount of discount for the purchase. The receipt may further include information on payment method, such as cash, check, credit card, debit card, and sufficient information to identify the particular debit or credit card. Each card account may be held at the same or different banks.

The receipt management engine 930 uses information stored in the receipt vault 910 and organizes the information in any manner requested by the system users. Thus, with this information, the system enables customers to search across accounts for receipts and figure out which card or other payment method they used to make a purchase. This may apply to accounts managed by multiple institutions. The receipt vault 910 may be searched by customers and may provide multiple filtering categories to enable simplified management. Furthermore, in some embodiments, customers may have access to receipts for accounts of family members in order to allow for household reporting and management. The receipt management engine 930 may provide functionality for tagging, categorization, searching, report generation, return management, exception handling, coupon generation, returns management, product information management, tax handling, and warranty management. This functionality is described in greater detail in co-pending application Ser. No. 13/165,929 which is incorporated herein by reference.

With respect to tagging, in addition to the functionality described above pertaining to the tagging of particular purchases with a purchaser identity, the system may allow users to tag a receipt across multiple characteristics. For example, every receipt where a specified credit card was used may be tagged for that credit card. Every receipt relevant to a food purchase may be tagged for consumables. Ticket purchases may be tagged as entertainment. Receipts may be tagged across payment method such as debit, credit, cash, or check, a particular account number, category of goods or services, price, discount, amount thresholds, date ranges, payment methods such as debit or credit, banks, and accounts, such as specific account numbers.

Categorization components may operate to automatically categorize the receipt data based on the purchase. This categorization may be typically be across the category of goods, but may account for other factors. For example, as set forth in co-pending application Ser. No. 11/952,457, transactions can be categorized by project.

The receipt management engine 930 provides search functionality that allows searching across categories and tags in accordance with a user request. For example, a system user may want to see all transactions with total sales amounts between $100 and 200. Alternatively, the system user may seek all purchases made with credit cards. System users can combine these characteristics to search for all sales for amounts between $100 and $200 paid with credit cards, and can further exclude purchases for travel from the results if desired.

The receipt management engine 930 additionally provides report functionality for producing comprehensive reports in accordance with a user request. For example, commands may be entered through the user interface to produce reports or the search engine may generate output to create reports. The reports may, in embodiments of the invention, be in spreadsheet format, such as for example, Microsoft Excel, or may alternatively be displayed for example in CSV or flat text format. Search criteria may be implemented on the report to search to and from various dates. Furthermore, reports may be generated automatically in accordance with pre-set parameters, such as monthly, quarterly, or yearly. The pre-set parameters alternatively may trigger generation of a report upon reaching a pre-set expenditure threshold. Other triggers may also be implemented. Generated reports are preferably also searchable based on user-selected parameters. Reports may be generated for selected categories or selected tags or both selected categories and selected tags.

The receipt management system 930 may include an exception handler configured to accept manual entry when issuance of an electronic receipt or a paper receipt fails such that an image cannot be captured. For example, the user may manually enter a type of purchase, date of purchase, location of purchase, and amount of purchase. The above-described matching functionality will ultimately match the manually entered sale with the POS record. Manually entered information may also be utilized by the expense splitting system when appropriate. Additionally, when traditional receipt generation fails, the user may capture an image at the point of purchase and enter the image into the system. For example, if a gas pump fails to produce a receipt, the captured image may include a gas pump with an amount of sale. In other examples, the captured image may include another type of automated dispenser, an image of a cash register, or of a product purchased. The image may ultimately be matched by the system with the appropriate POS record based on manually entered details of the purchased processed through the exception handler. In embodiments of the invention, the image and/or matched record may be exported to online storage in a displayed database or other storage area for later retrieval.

The receipt management engine 930 may also include coupon functionality for generating user-specific coupons based on the specific items purchased by the users. These coupons may be found in an external or internal database located in a storage area. Further, the coupons may be provided to the system by merchants upon registering a purchase, based on the items purchased. These coupons may be printable or scannable at the point of purchase for pre-determined products. In operation, the coupon generator may scan stored receipts and perform a search of coupons based on the items purchased. The receipts may be scanned upon entry into the vault or periodically at pre-set intervals.

The receipt management engine 930 may also include software for handling returns. A returns handler is operable to enable a purchaser to use the captured receipt image matched with the POS record to execute a return. In operation, a customer may select a receipt and transmit data from a mobile device to a POS terminal. The POS terminal may run compatible software to execute a return. Upon return of an item, the returns handler may delete the records of the returned item or may tag and categorize the item as returned and store the purchase and return information for the returned item in a designated location.

The receipt management engine 930 may also incorporate product information handling functionality that accesses internal or external databases to locate information about a purchased product and make that information easily accessible to the purchaser. For example, the system may locate accessories, such as, for example, appropriate batteries for a tool purchased, a suitable bulb for a purchased light fixture, or ink cartridges for a purchased printer, and may provide links to these products to the purchaser through a provided interface. Furthermore, the product information handler may locate servicing information. For example, if a service, such as an oil change is purchased for a car, the product information handler may locate the next required service milestone and provide the purchaser with an alert before the next service is required. The product information handler may further locate instruction manuals for purchased products and provide a selectable link to the instruction manual. The information may be located through available external and/or internal databases, such as databases 950 shown in FIG. 9. Thus through the provided system, a purchaser's record is complete with all associated product information. In embodiments of the invention, the system offers all of this information through a user interface available at a web site accessible to system users such as purchasers. Additional product information may include a photograph of the product for storage and association with other collected product information.

The receipt management engine 930 may also incorporate tax processing functionality. The system may register a purchase if that purchase has potential tax consequences. For example, if a purchase is made for a rental property and is properly categorized, the system may save the information for additional tax processing. Further, if a transaction is a charitable donation, the system may store this information for subsequent tax processing. In embodiments of the invention, the system categorizes stored tax information so as to be easily accessible to system users.

Additionally, the receipt management engine 930 may store warranty information related to purchased products and provide a link to the warranty information in association with the stored receipt and POS record. Purchasers may be provided with alerts or reminders prior to the expiration of a warranty and/or offers to extend the warranties. The receipt management system may combine warranty and product information to provide a comprehensive interface for each purchased product, so that users can view purchase information, warranty information, instruction manuals, and accessories simultaneously. In embodiments of the invention, warranty information can be integrated with an online calendar. Thus, based on a purchase date, warranty expiration dates and renewal opportunities may be integrated with the calendar.

Thus, embodiments of the invention provide a system and method for capturing an image of a receipt, attaching the receipt to a transaction, and transforming a receipt image to receipt image data, for example by performing OCR or other process that can transform an image to data on the receipt. The data encapsulated through the transformation process provides sufficient information for the system to categorize the transaction, convert the transaction to data, and tag the transaction. Using this information, the system can create customized reports within parameters established by the purchaser or predetermined by the system. Furthermore, the data enables real time expense splitting among purchasers and enables real time payment and reimbursement. As explained above, various software modules can be executed by one or more computer processors to operate to retrieve information based on recorded purchases and offer enhanced functionality to system users.

While image capture can be integrated with the system, the system may also operate on electronic receipts provided by a merchant or on receipts transferred from other systems, such as the expense splitting system, and these receipts may be stored in the receipt vault 910. For example, at checkout, a purchaser may be asked whether an electronic receipt or paper receipt is preferred. If an electronic receipt is preferred, the purchaser may receive an electronic receipt directly from the merchant and enter this receipt into the system. Furthermore, the system is capable of operating on electronic receipts received when a purchaser engages in online transactions. In this instance, customers may electronically transmit the receipt via email, by entering information into the user interface 940, which may be available on a receipt management website, or by any other method.

The user interface tools 940 interact with user systems to allow access to reports and data generated by the receipt management system. The user interface tools 240 facilitate operation of the other components of the system through manual intervention. Furthermore, the user interface tools 940 facilitate viewing of data and reports, thereby enabling users to view the record. In preferred embodiments of the invention, purchases displayed on the user interface should be represented by a selectable link, such that selection of the link will provide additional detail on any item presented. In embodiments of the invention pop-up windows may be implemented to display selected data, although other designs are within the scope of the invention.

In embodiments of the invention, the user interface tools 940 are accessible to customers through a web site to enable viewing of transaction break down and customized reports. This may include detailed expense splitting information processed through the mobile expense splitting application. Customers may enter the captured images into the system through the website to implement the receipt collection engine or alternatively, an application accessed through the user computing device implemented by the customer may operate on the captured image. The image of the receipt may serve as the actual receipt of record back to the merchant so that customer could dispose of the paper receipt and print or show the electronic receipt on a mobile device in order to return merchandise or exercise warranty rights.

Figure 10:
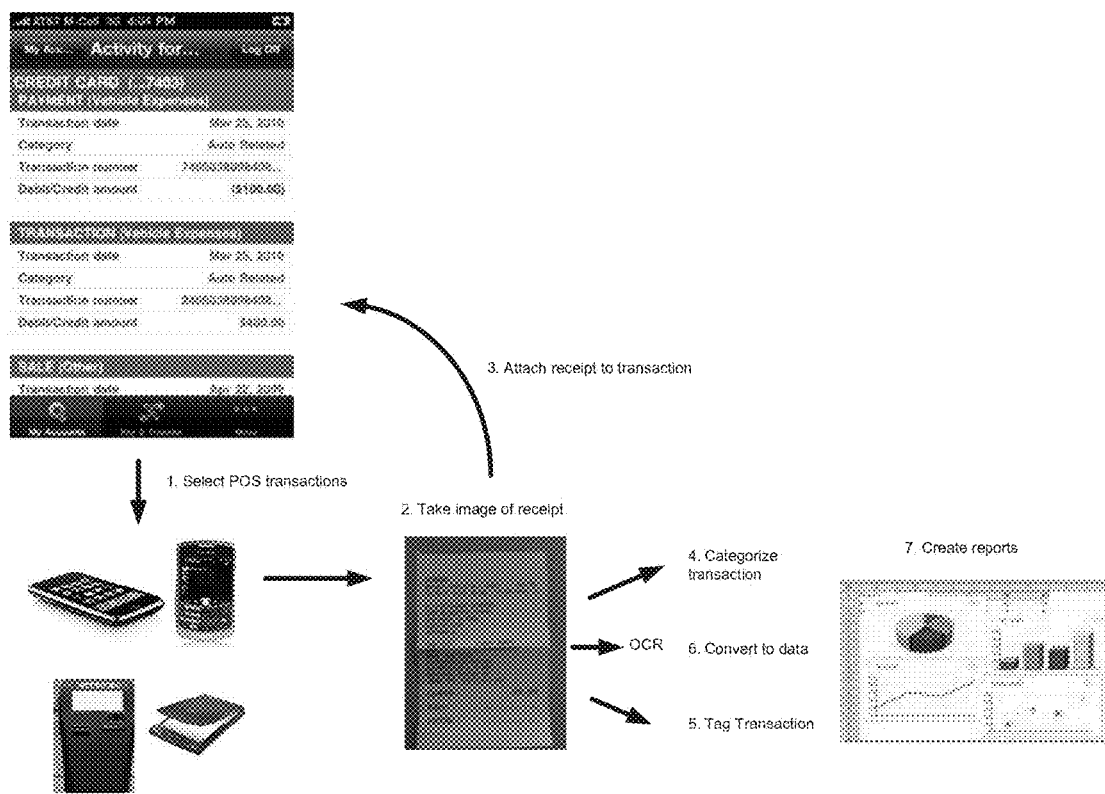
FIG. 10 is a work flow diagram illustrating receipt management procedures in accordance with an embodiment of the invention.

FIG. 10 is a work flow diagram illustrating receipt management procedures in accordance with an embodiment of the invention. In step 1, a mobile device user may import a transaction record. In step 2, the mobile device user may implement the mobile device to take an image of the receipt. In step 3, the mobile device user may attach the receipt to the transaction record through functionality provided in the receipt management system. The mobile device user may also implement the receipt management system to categorize the transaction in step 4 and tag the transaction in step 5. Categorization may include, for example, putting the transaction in a category such as travel, entertainment, dining, clothing, household, etc. Furthermore, categories may include various projects as set forth in co-pending application Ser. No. 11/952,457, filed on Dec. 7, 2007, which is hereby incorporated by reference. Tagging of the transaction may include associating the transaction with multiple identifiers or characteristics. The mobile device user then may allow the receipt management system to operate on the transaction by performing optical character recognition (OCR) on the receipt and converting the transaction to data in step 6. In step 7, the receipt management system generates reports as requested by the mobile device user. The reports may provide budget tracking in order to assist customers with adherence to realistic goals. The order of the steps illustrated may be altered in any desired manner. Thus, the receipt management system collects, stores, and organizes receipts. Mobile device users may have easy access to receipts and avoid the hassle of storing hard copies of receipts. Mobile users implementing the expense splitting system can enter their purchases into the receipt management system for enhanced functionality and subsequent retrieval.

Figure 11:
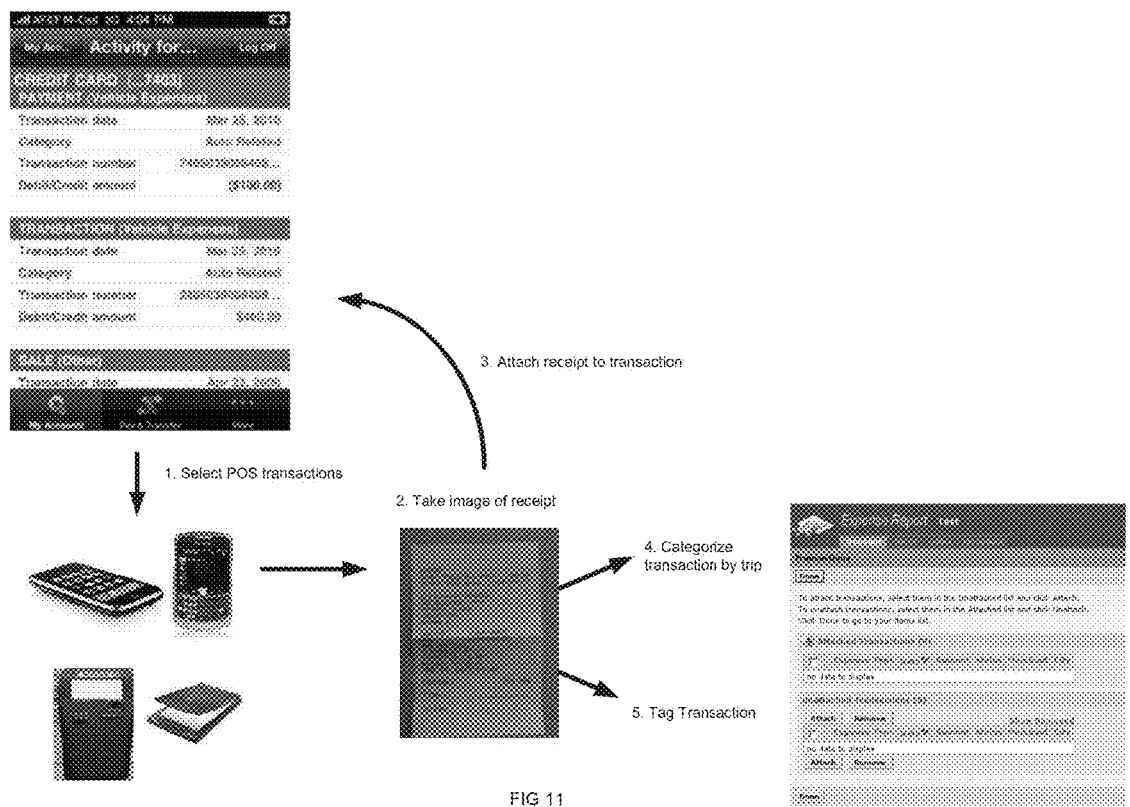
FIG. 11 is a work flow diagram illustrating procedures for creating a travel report in accordance with an embodiment of the invention.

FIG. 11 is a work flow diagram illustrating procedures for creating a travel report in accordance with an embodiment of the invention. In this embodiment, employee users of the system may save time by capturing images of receipts for automatic importation in corporate travel and expense software. In step 1, a mobile device user may import a transaction record. In step 2, the mobile device user may implement the mobile device to take an image of the receipt. In step 3, the mobile device user may attach the receipt to the transaction record. The mobile device user may also implement the receipt management system to categorize the transaction in step 4 or may allow the system to automatically categorize the transaction. In this instance, the illustrated categorization is by trip. The mobile device user may also implement the receipt management system to tag the transaction in step 5. In step 6, the receipt management system generates reports as requested by the mobile device user. The order of the steps illustrated may be altered in any desired manner.

Embodiments of the invention have wide applicability to corporate systems as employees may have receipts obtained during business travel automatically imported into travel and expense software utilized by the employer. The system thereby enables improved management of travel expenses by employees by collecting, storing, and organizing the receipts. Travel may be managed by tagging of purchases across categories. Furthermore, employees traveling together may utilize the expense splitting system in combination with the receipt management system in order to manage all expenses during a corporate trip.

Figure 12:
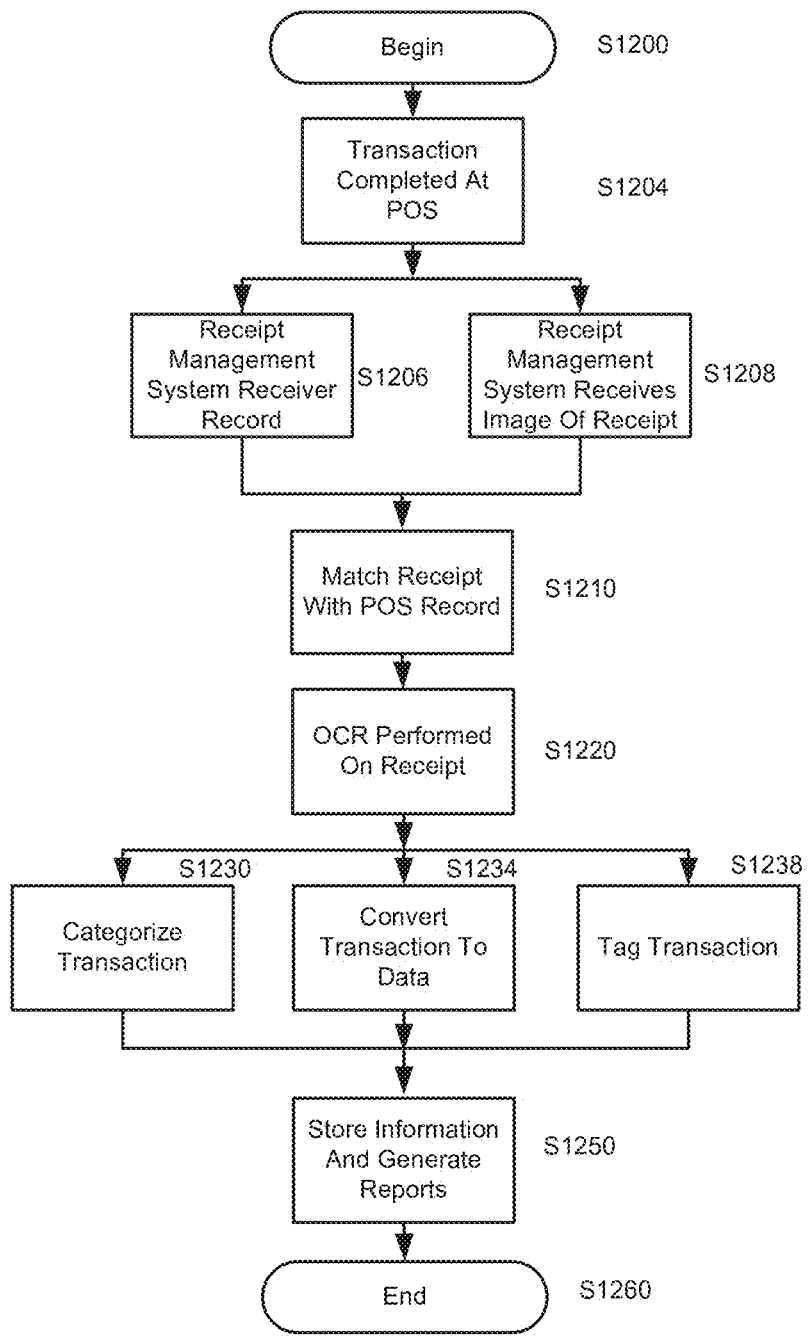
FIG. 12 is a flow chart illustrating a method for receipt management in accordance with an embodiment of the invention.

FIG. 12 is a flow chart illustrating a method for receipt management in accordance with an embodiment of the invention. The process begins in S1200 and the transaction is completed at the POS in S1204. The receipt management system receives the transaction record in S1206 and the image of the receipt in S1208. The image may be transmitted, for example, through a user's mobile device. In S1210, the received POS transaction record may be matched with the image of the receipt. In S1220, OCR may be performed on the receipt. The system may categorize the transaction in S1230, convert the transaction to data in S1234, and tag the transaction in S1238. In S1250, the system may store information and generate reports in the manner requested by the system user. The order of the steps is merely exemplary and the order may be altered in any manner that might be apparent to one skilled in the art.

It is likely that multiple computing systems or devices will be utilized to implement the method and system in accordance with embodiments of the invention. Each computing system may include a processing unit, a peripheral interface, a user input interface, a system bus, a system memory, a network interface, a memory interface, and any other components. Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM).

A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system, receipt management components, other program modules, and program data.

As described above, embodiments of the system of the invention and various processes of embodiments are described. The system of the invention or portions of the system of the invention may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, which enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Accordingly, embodiments of the invention provide a system for allocating each item on a receipt so that only the appropriate parties bear the expense. Furthermore, embodiments of the invention enable the parties splitting the expense to quickly and efficiently electronically settle their finances between one another. Embodiments of the invention further enable enhanced record keeping and reporting functionality.

While particular embodiments of the invention have been illustrated and described in detail herein, it should be understood that various changes and modifications might be made to the invention without departing from the scope and intent of the invention.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A computer-implemented expense splitting method for allowing a payer to divide expenses for a bill among multiple purchasers, the expense splitting method controlled from a payer mobile device, the method comprising:
   transforming a receipt to purchase data that identifies each of one or more purchase entries using the payer mobile device, wherein the receipt is captured via an image or transmitted to the payer mobile device by a merchant;
   providing an interactive tagging user interface on the payer mobile device generated based on the identified one or more entries in the purchase data, the interactive tagging user interface displaying one or more entries corresponding to one or more purchases and a tagging option in the interactive tagging user interface for tagging each of the entries with an indicator of one or more stored identities of the purchasers available from a recipient list interface, wherein the transformation of the receipt to the purchase data displays an automated alert on the interactive tagging user interface for input regarding the tagging option for tagging each of the entries;
   determining when each of the entries on the interactive tagging user interface have been tagged in real time and prompting for tagging until all entries have been tagged;
   allocating with an allocation engine a percentage of each of the entries on the interactive user interface to at least one of the purchasers based on the indicator of the one or more identities of the purchasers for each of the entries from the tagging when the determination indicates the tagging of all the entries is complete;
   calculating an amount due from each of the purchasers based on the allocation, wherein the amount due includes allocating an amount of tax due based on the calculated amount due from each of the purchasers;
   providing a payment interface on the payer mobile device for allowing online payment from the payer for a total amount of purchase for the bill; and
   generating electronic reimbursement requests from the payer mobile device, the reimbursement requests automatically triggered in real time by the payment and requesting each of the purchasers to reimburse for the amount due from each of the purchasers, the reimbursement requests transmitted over a communication network from the payer mobile device to an electronic address stored for each of the purchasers and allowing online reimbursement to the payer from remote devices associated with the purchasers, wherein the payer mobile device receives an electronic notification and a transaction record is updated when each of the reimbursement requests is completed.

2. The method of claim 1, further comprising capturing the receipt image with a mobile device.

3. The method of claim 1, wherein transforming the captured receipt image to receipt data comprises performing optical character recognition.

4. The method of claim 1, wherein the at least one purchase corresponds to items on a restaurant bill.

5. The method of claim 1, further comprising facilitating online payment in real time through the payment interface.

6. The method of claim 1, further comprising triggering the reimbursement requests upon receipt of a payment request.

7. The method of claim 1, further comprising storing the purchase data and receipt image in an expense management system.

8. The method of claim 1, further comprising providing a reimbursement request interface for selecting purchasers.

9. The method of claim 1, wherein the system automatically generates reimbursement requests based on payment and allocation.

10. The method of claim 1, further comprising matching the receipt image and purchase data with a POS transaction record and storing the information in an expense management system.

11. A computer-implemented expense splitting system for allowing a payer to divide expenses for a bill among multiple purchasers, the expense splitting method controlled from a payer mobile device, the system comprising:
   at least one computer memory storing payer data and expense splitting instructions;
   at least one computer processor accessing the computer memory and executing the instructions to perform steps including:

transforming a receipt to purchase data that identifies each of one or more purchase entries using the payer mobile device, wherein the receipt is captured via an image or transmitted to the payer mobile device by a merchant;

providing an interactive tagging user interface generated based on the identified one or more entries in the purchase data, the interactive tagging user interface displaying one or more entries corresponding to one or more purchases and a tagging option in the tagging user interface for tagging each of the entries with an indicator of one or more stored identities of the purchasers available from a recipient list interface, wherein the transformation of the receipt to the purchase data displays an automated alert on the interactive tagging user interface for input regarding the tagging option for tagging each of the entries;

determining when each of the entries on the interactive tagging user interface have been tagged in real time and prompting for tagging until all entries have been tagged;

allocating with an allocation engine a percentage of each of the entries on the interactive user interface to at least one of the purchasers based on the indicator of the one or more identities of the purchasers for each of the entries from the tagging when the determination indicates the tagging of all the entries is complete;

calculating an amount due from each of the purchasers based on the allocation, wherein the amount due includes allocating an amount of tax due based on the calculated amount due from each of the purchasers;

providing a payment interface for allowing online payment from the payer for a total amount of purchase for the bill; and generating electronic reimbursement requests from the payer mobile device, the reimbursement requests automatically triggered in real time by the payment and requesting each of the purchasers to reimburse for the amount due from each of the purchasers, the reimbursement requests transmitted over a communication network to an electronic address stored for each of the purchasers and allowing online reimbursement to the payer from remote devices associated with the purchasers, wherein an electronic notification is received and a transaction record is updated when each of the reimbursement requests is completed.

12. The system of claim 11, further comprising capturing the receipt image.

13. The system of claim 11, wherein transforming the captured receipt image to receipt data comprises performing optical character recognition.

14. The system of claim 11, wherein the at least one purchase correspond to items on a restaurant bill.

15. The system of claim 11, further comprising facilitating online payment in real time through the payment interface.

16. The system of claim 11, further comprising triggering the reimbursement requests upon receipt of a payment request.

17. The system of claim 11, further comprising storing the purchase data and receipt image in an expense management system.

18. The system of claim 11, further comprising providing a reimbursement request interface for selecting purchasers.

19. The system of claim 11, wherein the system automatically generates reimbursement requests based on payment and allocation.

20. The system of claim 11, further comprising matching the receipt image and purchase data with a POS transaction record and storing the information in an expense management system.

21. A non-transitory computer readable medium having stored thereon instructions for allowing a payer to divide expenses for a bill among multiple purchasers comprising executable code which when executed by at least one processor, causes the processor to:

transform a receipt to purchase data that identifies each of one or more purchase entries using the payer mobile device, wherein the receipt is captured via an image or transmitted to the payer mobile device by a merchant;

provide an interactive tagging user interface on the payer mobile device generated based on the identified one or more entries in the purchase data, the interactive tagging user interface displaying one or more entries corresponding to one or more purchases and a tagging option in the interactive tagging user interface for tagging each of the entries with an indicator of one or more stored identities of the purchasers available from a recipient list interface, wherein the transformation of the receipt to the purchase data displays an automated alert on the interactive tagging user interface for input regarding the tagging option for tagging each of the entries;

determine when each of the entries on the interactive tagging user interface have been tagged in real time and prompting for tagging until all entries have been tagged;

allocate with an allocation engine a percentage of each of the entries on the interactive user interface to at least one of the purchasers based on the indicator of the one or more identities of the purchasers for each of the entries from the tagging when the determination indicates the tagging of all the entries is complete;

calculate an amount due from each of the purchasers based on the allocation, wherein the amount due includes allocating an amount of tax due based on the calculated amount due from each of the purchasers;

provide a payment interface on the payer mobile device for allowing online payment from the payer for a total amount of purchase for the bill; and generate electronic reimbursement requests from the payer mobile device, the reimbursement requests automatically triggered in real time by the payment and requesting each of the purchasers to reimburse for the amount due from each of the purchasers, the reimbursement requests transmitted over a communication network from the payer mobile device to an electronic address stored for each of the purchasers and allowing online reimbursement to the payer from remote devices associated with the purchasers, wherein the payer mobile device receives an electronic notification and a transaction record is updated when each of the reimbursement requests is completed.

22. The non-transitory computer readable media of claim 21, wherein the executable code when executed by the one or more processors further causes the one or more processors to facilitate online payment in real time through the payment interface.

23. The non-transitory computer readable media of claim 21, wherein the executable code when executed by the one or more processors further causes the one or more processors to trigger the reimbursement requests upon receipt of a payment request.

24. The non-transitory computer readable media of claim 21, wherein the executable code when executed by the one or more processors further causes the one or more processors to provide a reimbursement request interface for selecting purchasers.

25. The non-transitory computer readable media of claim 21, wherein the executable code when executed by the one or more processors further causes the one or more processors to automatically generate reimbursement requests based on payment and allocation.

26. The non-transitory computer readable media of claim 21, wherein the executable code when executed by the one or more processors further causes the one or more processors to match the receipt image and purchase data with a POS transaction record and storing the information in an expense management system.

* * * * *

UNITED STATES PATENT AND TRADEMARK OFFICE
CERTIFICATE OF CORRECTION

PATENT NO. : 10,134,023 B2
APPLICATION NO. : 14/033768
DATED : November 20, 2018
INVENTOR(S) : Michelle Zheng et al.

Page 1 of 1

It is certified that error appears in the above-identified patent and that said Letters Patent is hereby corrected as shown below:

On the Title Page

Inventors (Column 1, Line 7), please change "Zhgeng" to ---Zheng---.

Signed and Sealed this
Second Day of July, 2019

Andrei Iancu
*Director of the United States Patent and Trademark Office*